United States Patent [19]

Nagano et al.

[11] Patent Number: 4,695,899
[45] Date of Patent: Sep. 22, 1987

[54] RECORDING AND REPRODUCING SYSTEM EMPLOYING BALANCED MODULATION FOR COLOR VIDEO SIGNAL

[75] Inventors: Masahiko Nagano; Naoaki Sakaki, both of Kanagawa, Japan

[73] Assignee: Fuji Photo Film Co., Ltd., Kanagawa, Japan

[21] Appl. No.: 675,289

[22] Filed: Nov. 27, 1984

[30] Foreign Application Priority Data

Nov. 30, 1983 [JP] Japan .................... 58-225990

[51] Int. Cl.$^4$ .............................................. H04N 9/79
[52] U.S. Cl. .................................... 358/310; 358/327; 358/12; 358/15
[58] Field of Search ............ 358/310, 314, 323, 324, 358/328, 330, 21 R, 21 V, 23, 12, 15, 11, 327

[56] References Cited

U.S. PATENT DOCUMENTS 4,567,507  1/1986  Kusakabe et al. ................ 358/11
4,568,963  2/1986  Sakai ............................... 358/11

Primary Examiner—Robert L. Richardson

[57] ABSTRACT

A color video signal recording system comprises means for producing a quadrature two-phase balanced-modulated color signal by subjecting a subcarrier to quadrature two-phase balanced modulation by two color signals, means for producing a demodulation-purpose reference phase signal which has the same frequency as that of the subcarrier and which is to be frequency-interleaved with the quadrature two-phase balanced-modulated color signal, means for multiplexing the quadrature two-phase balanced-modulated color signal and the demodulation-purpose reference phase signal together with a luminance signal, and means for recording the multiplex signal on a recording medium after subjecting it to angle modulation. In a reproducing system, the reproduced signal is subjected to angle demodulation after being limited in its amplitude, and the luminance signal, the quadrature two-phase balanced-modulated color signal and the reference phase signal are separated from the demodulated signal, the quadrature two-phase balanced-modulated signal being then demodulated on the basis of the separated reference phase signal.

6 Claims, 29 Drawing Figures

RECORDING AND REPRODUCING SYSTEM EMPLOYING BALANCED MODULATION FOR COLOR VIDEO SIGNAL

BACKGROUND OF THE INVENTION

1. Field of the Invention

This invention relates to recording and reproducing system for a color video signal, and more particularly to an improved chroma signal recording and reproducing system which minimizes deviation of hue from the original hue as well as deviation of color saturation from the original color saturation and eliminates drop-out or missing of color information thereby ensuring a high quality of reproduced pictures.

2. DESCRIPTION OF THE PRIOR ART

Various types of chroma signal recording and reproducing systems have been proposed hitherto. Among them, two types, that is, the low-band conversion type and the color-difference line-sequential FM type are typical of those commonly employed in magnetic picture recording and reproducing apparatus for home use, such as video tape recorders. The basic principle, merits and demerits of these two types will now be described before describing the present invention in detail.

(1) Low-band conversion type

According to this type, a subcarrier is subjected to quadrature two-phase balanced modulation by two color difference signals to obtain a modulated chrominance signal commonly used in the NTSC system or PAL system, the frequency band of the chrominance signal being then converted into that lower than the FM band of a luminance signal, and this low-band converted chrominance signal is superposed on the FM luminance signal to be recorded together with the luminance signal on a magnetic recording medium such as a video tape. In the playback mode, the low-band converted chrominance signal is separated from the reproduced signal to be then restored to the original high-band chrominance signal by a frequency converter. The restored chrominance signal is then synthesized with the separately demodulated luminance signal to provide the color video signal commonly used in the standard NTSC system or standard PAL system.

Therefore, the low-band conversion type exhibits the following merits among others:

(a-1) By virtue of the quadrature two-phase balanced modulation, the two color difference signals can be recorded in multiplex in the same frequency band without widening the frequency band occupied by the chrominance signal.

(a-2) In an apparatus such as a VTR in which a color video signal is recorded by moving a magnetic recording medium relative to a magnetic head, there occurs a time base variation in the reproduced signal when the speed of the magnetic recording medium moving relative to the magnetic head varies. However, because of the fact that this time base variation causes merely a phase variation of the chrominance signal, the conversion of the frequency band of the chrominance signal into its original high-frequency band alleviates the adverse effect of the time base variation when the chrominance signal is recorded in the form converted into the low-frequency band.

(a-3) The simple procedure for merely converting the frequency band of the chrominance signal is only required for the recording and reproduction of a color TV signal used in the NTSC system or PAL system.

(a-4) The chrominance signal is provided by modulation according to an AM mode. Therefore, no beat interference occurs even when adjoining two tracks may be scanned by the magnetic head at the same time in the playback mode, and crosstalk can be easily eliminated by means of phase shift (PS) or phase inversion (PI). Thus, the low-band conversion type is suitable for guardband-less recording.

On the other hand, the low-band conversion type has the following demerits among others:

(b-1) The chrominance signal is provided by modulation according to the so-called AM mode. Therefore, when a level variation occurs in the reproduced signal due to, for example, a variation of the reproducing engagement between the magnetic recording medium and the magnetic head, the level variation cannot be removed resulting in deviation of color saturation from the original color saturation.

(b-2) Since the chrominance signal obtained by the balanced modulation does not include the carrier component, a continuous reference carrier having the same frequency and phase as those of the subcarrier used during the modulation must be prepared and used for the purpose of synchromous detection during demodulation of the color signal. However, when a time base variation is present in the reproduced chrominance signal, the reference carrier cannot completely follow up the time base variation resulting in deviation of hue from the original hue, even when, for example, an APC circuit is incorporated to produce the reference carrier on the basis of the color burst signal.

(b-3) The low-band converted color signal is superposed on the FM luminance signal to be recorded together with the luminance signal on a magnetic recording medium. Therefore, when a distortion of third order typical of magnetic recording appears in the recording and reproducing system, a beat interference (moire) due to cross modulation appears in the reproduced luminance signal. In order to alleviate this moire interference, it is necessary that the frequency of the subcarrier converted into the low band is to be selected at a special valve to fully utilize the effect of interleaving or that the level of the low-band converted color signal relative to the FM luminance signal is to be severely restricted.

In regard to the level variation described in (b-1), incorporation of a conventional AGC circuit which controls the gain on the basis of the detected burst level has been effective for compensation of the sensitivity difference between the magnetic heads and for correction of the mean level in each field. However, it has been difficult for the AGC circuit to suppress an instantaneous level variation.

(2) Color-difference line-sequential FM type:

According to this type, the two color difference signals are subjected to frequency modulation (FM), and the FM color difference signals are alternately recorded at a time interval of one horizontal scanning period (1H). In the playback mode, in lieu of the color difference signal omitted in the record mode, the signal corresponding to the preceding one horizontal scanning period (1H) is obtained by delaying the reproduced signal by 1H, and such a signal is used to supplement the omitted signal.

Therefore, this color-difference line-sequential FM type exhibits the following merits among others:

(c-1) By virtue of the use of frequency modulation (FM), a level variation that may occur can be removed by a limiter, and any deviation of color saturation from the original color saturation does not occur.

(c-2) By virtue of the use of the frequency modulation, deviation of hue from the original hue does not also occur even in the presence of a time base variation.

On the other hand, the color-difference line-sequential FM type has the following demerits among others:

(d-1) According to its basic principle, the color signal information drops out at an interval of one horixontal scanning line. Therefore, the vertical resolution of color is degraded.

(d-2) The azimuth effect is not so markedly exhibited since the frequency band used for recording the FM color signal is generally set to be lower than the FM band of the luminance signal, and, even when an inclined azimuth arrangement is employed, simultaneous scanning for reproduction of information from adjoining two tracks by the magnetic head results in occurrence of a beat interference. Therefore, the color-difference line-sequential FM type is not suitable for guard-band-less recording, and it is difficult to increase the picture recording density.

SUMMARY OF THE INVENTION

With a view to solve the prior art problems pointed out above, it is a primary object of the present invention to provide a recording and reproducing system for a color video signal, which eliminates drop-out of color information, as experienced with the color-difference line-sequential FM type, without widening the occupied frequency band, and which reduces deviation of hue and color saturation to less than that experienced with the low-band conversion type even in the presence of a time base variation and a level variation, thereby ensuring reproduction of pictures of high quality.

In accordance with one aspect of the present invention, there is provided a color video signal recording system comprising means for producing a quadrature two-phase balanced-modulated color signal by subjecting a subcarrier to quadrature two-phase balanced modulation by two color signals, means for producing a demodulation-purpose reference phase signal which has the same frequency as that of the subcarrier and which is to be frequency-interleaved with the quadrature two-phase balanced-modulated color signal, means for multiplexing the quadrature two-phase balance-modulated color signal and the demodulation-purpose reference phase signal together with a luminance signal, and means for recording the multiplex signal on a recording medium after subjecting it to angle modulation.

In accordance with another aspect of the present invention, there is provided a color video signal reproducing system for reproducing a color video signal recorded on a recording medium, the color video signal being provided by multiplexing a quadrature two-phase balanced-modulated color signal obtained by subjecting a subcarrier to quadrature two-phase balanced modulation by two color signals and a demodulation-purpose reference phase signal which has the same frequency as that of the subcarrier and which is to be frequency-interleaved with the quadrature two-phase balanced-modulated color signal, together with a luminance signal, and subjecting the multiplex signal to angle modulation, the reproducing system comprising means for subjecting the reproduced signal to angle demodulation after limiting its amplitude, means for separating the luminance signal, the quadrature two-phase balanced-modulated color signal and the reference phase signal from the demodulated signal, and means for demodulating the quadrature two-phase balanced-modulated color signal on the basis of the separated reference phase signal.

Figure 1:
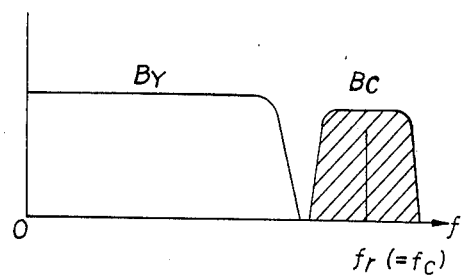
FIG. 1 illustrates a mode of frequency allocation to a luminance signal and a quadrature two-phase balanced-modulated color signal.

In the drawings, the following reference numerals are used to designate various parts respectively:

1, 2, 3, 4, 26, 37: addition circuit
5, 6, 27, 28: balanced modulator
7: subcarrier oscillator
8: 90° phase shifter
9: standard signal generator
10: offset voltage generator
11: index pulse generator
12: angle modulator
14, 19: magnetic head
15, 16, 17, 22, 27a, 28a: low-pass filter 18, 23: band-pass filter
20, 29: limiter
21: angle demodulator
24: 1H delay line
25: subtraction circuit
30: inversion circuit
31: 270° phase shifter
32: horizontal synchronizing signal separation circuit
33: inversion pulse generator
34: PLL circuit
35: gate pulse generator
36: burst signal separation gate
38: encoder for producing NTSC chrominance signal
39: 3.58 MHz oscillator
43, 44: trap circuit
45: 2H delay line

DESCRIPTION OF THE PREFERRED EMBODIMENTS

The basic principle and advantages of the present invention are as follows:

(i) In order to record all of color information without widening the frequency band occupied by the color information, two color signal, for example, color difference signals R-Y and B-Y are multiplexed after subjecting them to quadrature two-phase balanced modulation.

(ii) In order to obviate deviation of hue from the original hue due to a time base variation, a continuous reference phase signal for synchronous detection is previously multiplexed with the quadrature two-phase balanced-modulated color signal to be recorded. Since the reproduced reference phase signal is also affected by a time base variation similar to that affecting the reproduced quadrature two-phase balanced-modulated color signal, this reproduced reference phase signal is utilized for the demodulation of the color signal, so that the time base variations can be cancelled to eliminate hue deviation. In this case, the frequency Fr of the reference phase signal is selected to be equal to the subcarrier frequency fc of the quadrature two-phase balanced-modulated color signal, so that the occupied frequency band may not be widened and the time base variation occurred in the reference phase signal coincides with that of the quadrature two-phase balance-modulated color signal as much as possible. However, in order that the quadrature two-phase balanced-modulated color signal and the references phase signal can be separated from each other during reproduction, the phase of, for example, the reference phase signal is inverted at a time interval of 1H for the purpose of frequency interleaving of the two signals.

(iii) In order that saturation deviation due to a level variation as well as a moire interference due to a distortion of third order may not occur, the quadrature two-phase balanced-modulated color signal and the reference phase signal are multiplexed together with the luminance signal, and, then, the resultant multiplex signal is recorded after being subjected to FM or PM angle modulation. When the multiplex signal is subjected to the angle modulation, a level variation can be removed by a limiter during reproduction, thereby eliminating occurrence of saturation deviation. Further, since the multiplex signal is recorded after being subjected to the angle modulation, any moire interference due to a distortion of third order would not occur in the reproduced luminance signal even if such a distortion might be present in the recording and reproducing system. Accordingly, the level of the quadrature two-phase balanced-modulated color signal as well as that of the reference phase signal can be considerably increased thereby improving the S/N ratio. However, in the case of multiplexing the quadrature two-phase balanced-modulated color signal and the reference phase signal together with the luminance signal, care must be taken for the frequency interleaving with the luminance signal depending on the selected frequency of the subcarrier. More precisely, there are various modes of frequency allocation in connection with the multiplexing. In the case shown in FIG. 1, there is not any overlap between the band $B_y$ of the luminance signal and the band Bc of the quadrature two-phase balanced-modulated color signal. In the cases shown in FIGS. 2(a), 2(b) and 2(c), the band $B_y$ partly overlaps the band Bc, and the frequency fr of the reference phase signal (which frequency is equal to that of the subcarrier) is approximately equal to the upper limit frequency $B_{ymax}$ of the band $B_y$. In the case of FIG. 3, the band Bc is included substantially completely in the band $B_y$.

(A) In the case of FIG. 1, simple mutiplexing suffices since there is no interference between the luminance signal and the quadrature two-phase balanced-modulated color signal as well as the reference phase signal.

Figure 2A:
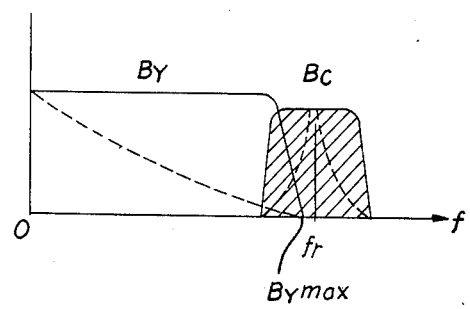
FIGS. 2(a), 2(b) and 2(c) illustrate other modes of frequency allocation.
Figure 3:
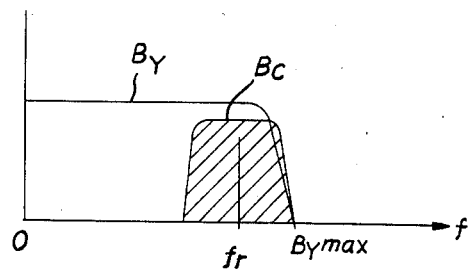
FIG. 3 illustrates still another mode of frequency allocation.

(B) In the case of FIG. 2(a), there is no interference between the luminance signal and the reference phase signal since $B_{ymax} < fr$, but there is some interference between the luminance signal and the quadrature two-phase balanced-modulated color signal. However, simple multiplexing suffices in practical applications since the power spectra of these two signals are as shown by the broken curves and the degree of interference is considered to be very little. When this interference can be sufficiently eliminated, the frequency fc of the subcarrier is so selected that the luminance signal and the quadrature two-phase balanced-modulated color signal can be frequency-interleaved with each other as in the case of the NTSC signal. For example, the frequency fc of the subcarrier is preferably selected as follows:

$$fc = \frac{(2n + 1)}{2} fH \qquad (1)$$

where fH is the horizontal scanning frequency, and n is a positive integer.

Figure 2B:
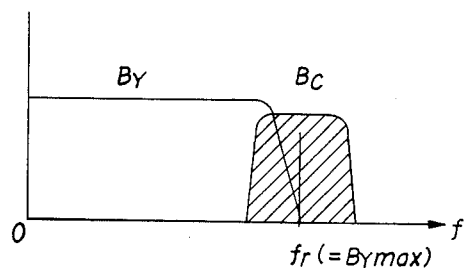

(C) In the case of FIG. 2(b), the interference of the luminance signal with the reference phase signal can be ignored, since B max=fr and the power of B max is zero. Further, the interference of the reference phase signal with the luminance signal can also be ignored since the former signal is passed through a low-pass filter during demodulation. The interference between the luminance signal and the quadrature two-phase balanced-modulated color signal can be ignored in practical applications as described in (B). However, the frequency of the subcarrier is so selected that the luminance signal and the quadrature two-phase balanced-modulated color signal can be frequency-interleaved with each other as required.

Figure 2C:
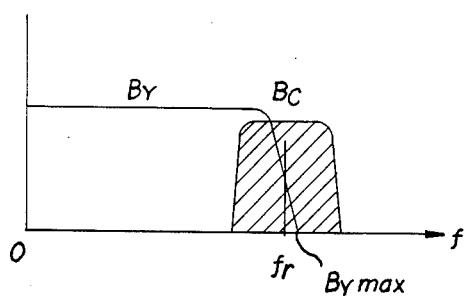

(D) In the case of FIG. 2(c), simple multiplexing will result in an interference between the luminance signal and the reference phase signal, since $B_{ymax} > fr$. Therefore, for example, the luminance signal is passed through an fr trap circuit before being multiplexed, thereby eliminating any interference of the luminance signal with the reference phase signal. The interference of the reference phase signal with the luminance signal can be ignored since the former signal is passed through a low-pass filter during demodulation, as described in (C). The interference between the luminance signal and the quadrature two-phase balanced-modulated color signal is as described in (B) and (C). As another example, the luminance signal is frequency-interleaved with the reference phase signal. In this case, when the luminance signal is to be frequency-interleaved with the quadrature two-phase balanced-modulated color signal, the frequency fc of the subcarrier is preferably so selected that these three signals can be finally frequency-interleaved with one another. For example, the frequency fc of the subcarrier is to be selected as follows, as in the case of the PAL system:

$$fc = \frac{2n + 1}{4} fH \qquad (2)$$

(E) In the case of FIG. 3, simple multiplexing results in a great interference. Therefore, the luminance signal is to be frequency-interleaved with the quadrature two-phase balanced-modulated color signal, and the luminance signal is to be passed through an fr trap circuit before being multiplexed or the luminance signal is to be frequency-interleaved with the reference phase signal. When the luminance signal is trapped, the frequency fc of the subcarrier is selected to satisfy the relation $$fc = \frac{2n + 1}{2} fH,$$

while, when the three signals are to be frequency-interleaved with one another, fc is selected satisfy the relation $$fc = \frac{2n + 1}{4} fH.$$

Suppose now that $$fc = 3.58 \text{ MHz} \left( = \frac{455}{2} fH \right),$$

and the reference phase signal is zero. Then, the multiplex signal before being subjected to the angle modulation provides an NTSC signal. Therefore, the recording and reproducing system of the present invention is analogous to the NTSC direct FM recording system used in a television broadcasting station. However, according to the NTSC direct FM recording system in which, during demodulation of a chrominance signal, it is necessary to produce, by an APC circuit, a continuous synchronous detection signal from the burst signal, the APC circuit cannot completely follow up a time base variation resulting in appearance of deviation of hue. Thus, the present invention is distinctly distinguished from the NTSC direct FM recording system. Further, in view of the fact that the major source of occurrence of a time base variation is the mechanism itself, it is difficult to completely remove such a time base variation by improving the mechanism.

Figure 4:
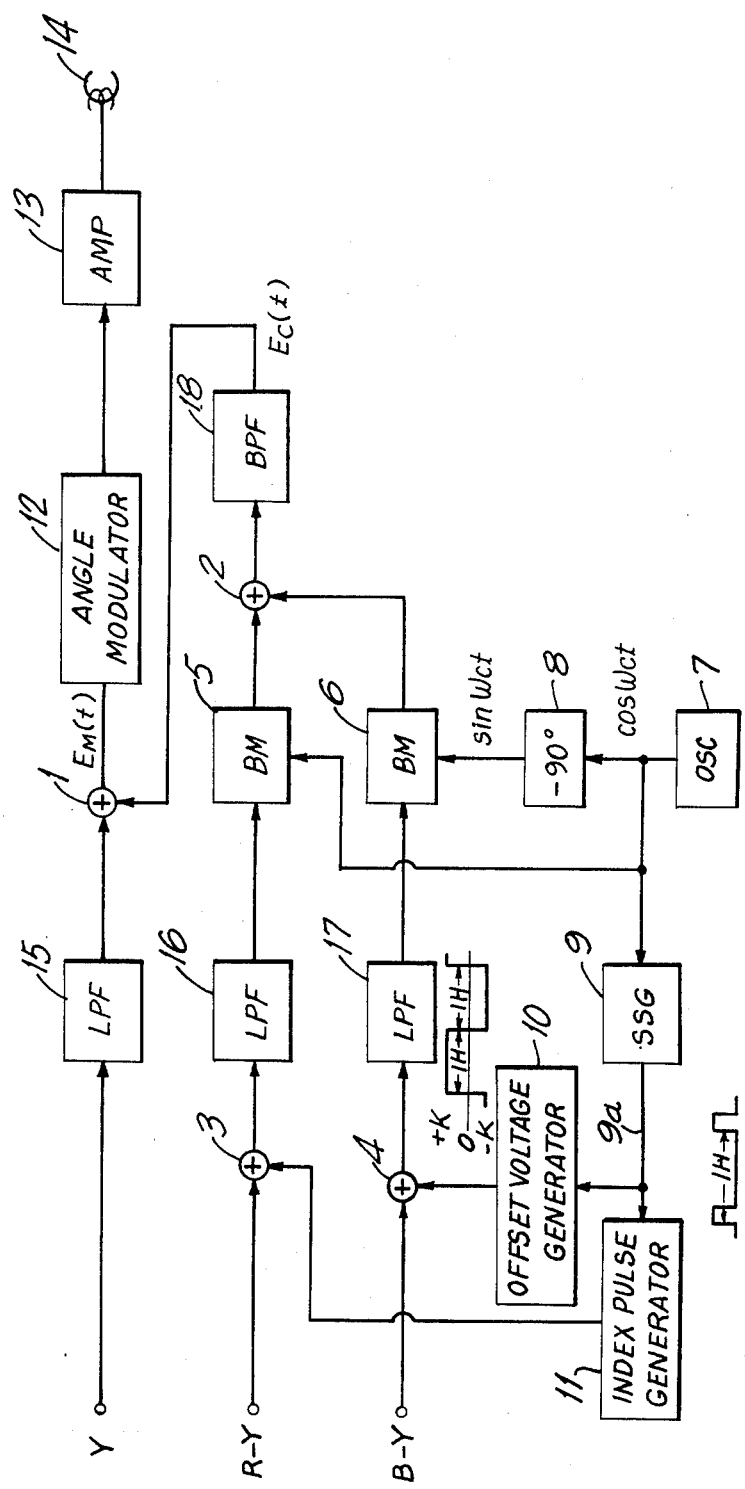
FIG. 4 is a block diagram showing the structure of an embodiment of the recording system according to the present invention.
Figure 5:
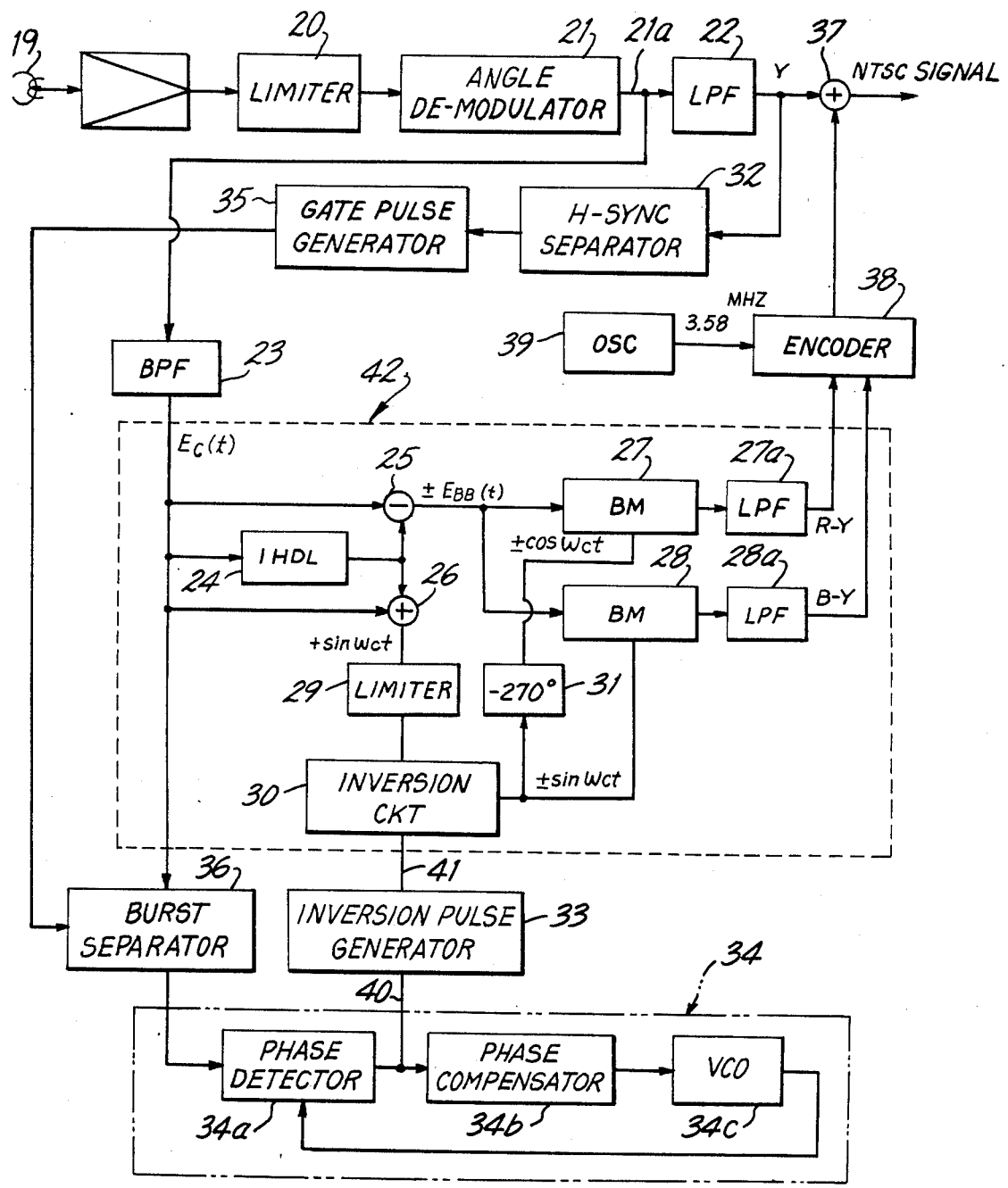
FIG. 5 is a block diagram showing the structure of an embodiment of the reproducing system according to the present invention.
Figure 6:
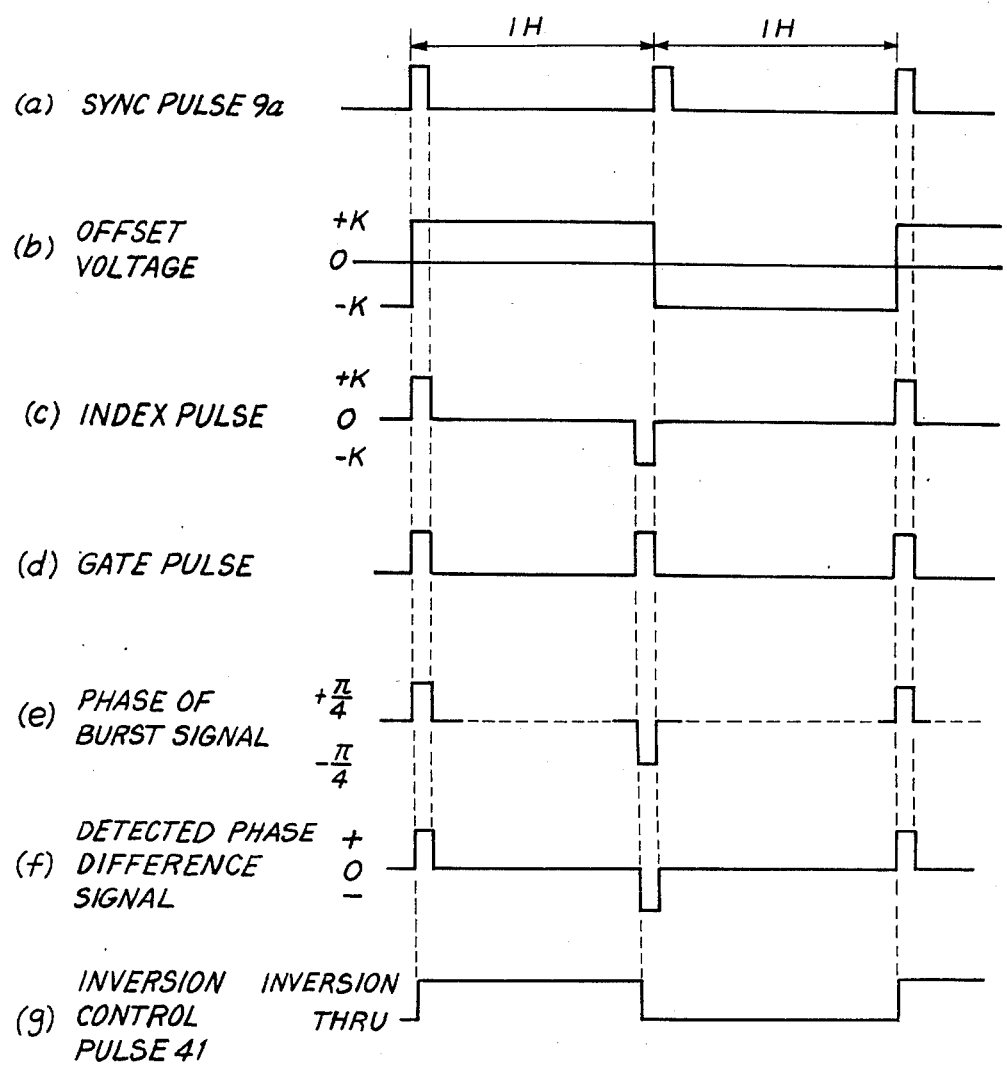
FIGS. 6(a) to 6(g) show operating waveforms appearing at various parts of FIGS. 4 and 5.
Figure 7:
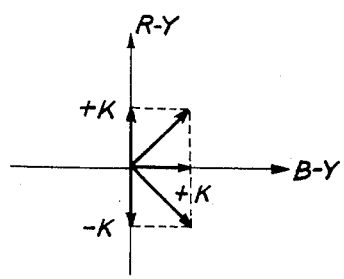
FIG. 7 shows the phase of the index pulse signal shown in FIG. 6(c).
Figure 8:
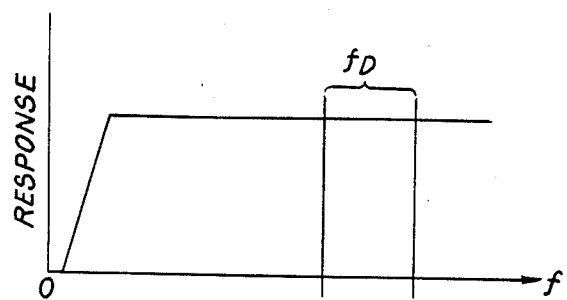
FIG. 8 illustrates the frequency band of an angle modulation signal.

An embodiment of the present invention when applied to a magnetic video recording and reproducing apparatus will now be described. FIG. 4 is a circuit diagram of the recording system of the apparatus, FIG. 5 is a circuit diagram of the reproducing system of the apparatus, FIGS. 6(a) to 6(g) show operating waveforms appearing at various parts of FIGS. 4 and 5, FIG. 7 illustrates the phase of the index pulse signal shown in FIG. 6(c), and FIG. 8 illustrates the frequency band of an angle modulation signal. In the embodiment of the present invention, color difference signals R-Y and B-Y are used as two color signals. Further, the mode of frequency allocation to a luminance signal, a quadrature two-phase balanced-modulated color signal and a reference phase signal is as described with reference to FIG. 2(b). Further, the luminance signal is frequency-interleaved with the quadrature two-phase balanced-modulated color signal.

Referring to FIG. 4, the symbol Y designates a luminance signal, and symbols R-Y and B-Y designate color difference signals respectively. The recording system comprises addition circuits 1, 2, 3, 4; balanced modulators 5, 6 for the quadrature two-phase balanced modulation; an oscillator 7 for generating the subcarrier; a 90° phase shifter 8 for the subcarrier; a synchronizing signal generator 9; an offset voltage generator 10 for producing the reference phase signal; an index pulse generator 11; an FM or PM angle modulator 12; a recording amplifier 13; a recording magnetic head 14; low-pass filters 15, 16, 17; and a band-pass filter 18.

Referring to FIG. 5, the reproducing system comprises a reproducing magnetic head 19; a limiter 20; an angle demodulator 21; a low-pass filter 22 for separating the luminance signal; a band-pass filter 23 for separating the composite signal including the reference phase signal and the quadrature two-phase balanced-modulated color signal; a 1H delay line 24, a subtraction circuit 25 and an addition circuit 26 for separating the reference phase signal and the quadrature two-phase balanced-modulated color signal; synchronous detection circuits 27, 28 each in the form of a balanced modulator; low-pass filters 27a, 28a; a limiter 29, an inversion circuit 30 and a 270° phase shifter 31 for producing a carrier used for synchronous detection; a horizontal synchronizing signal separation circuit 32; an inversion pulse generator 33, a PLL circuit 34, a gate pulse generator 35 and a burst signal separation gate generator 36 for controlling the inversion ciruit 30; and an addition circuit 37, an encoder 38 and a 3.58 MHz oscillator 39 for producing an NTSC signal.

Suppose now that the angular frequency of oscillation of the subcarrier oscillator 7 is $\omega c$. Then, the balanced modulated wave of one of the color difference signals or color difference signal R-Y is given by $$E_{R-Y}(t) \cos \omega ct,$$

and that of the other color difference signal B-Y is given by $$E_{B-Y}(t) \sin \omega ct$$

The composite signal $E_{BB}(t)$ of these two signals provides the quadrature two-phase balanced-modulated color signal, as follows:

$$E_{BB}(t) = E_{R-Y}(t) \cos \omega ct + E_{B-Y}(t) \sin \omega ct$$

where $E_{R-Y}(t)$ is the voltage signal wave of R-Y, and $E_{B-Y}(t)$ is the voltage signal wave of B-Y. Suppose that the angular frequency $\omega r$ of the reference phase signal is selected to be $$\omega r = \omega c \qquad (3)$$

Then, when the phase of the reference phase signal is inverted at a time interval of, for example, 1H, the reference phase signal and the quadrature two-phase balanced-modulated color signal $E_{BB}(t)$ are frequency-interleaved and can be separated from each other even after these signals are multiplexed. Any one suitable method may be employed for multiplexing the reference phase signal with the signal $E_{BB}(t)$. In the embodiment shown in FIG. 4, an offset voltage is added to one of the color difference signals or the color difference signal B-Y to realize multiplexing and frequency interleaving. More precisely, in response to the application of the output of the subcarrier generator 7, the standard signal generator 9 generates a synchronizing pulse signal 9a having a period of 1H as shown in FIG. 6(a), and, in response to the application of this pulse signal 9a, the offset voltage generator 10 generates a rectangular voltage signal whose amplitude is inverted between +K and -K at a time interval of 1H as shown in FIG. 6(b). Such an offset voltage signal ±K is added in the addition circuit 4 to the color difference signal B-Y. Consequently, the result of synthesis of the outputs of the two balanced modulators 5 and 6 provides a composite signal Ec(t) expressed as follows:

$$E_c(t) = E_{R-Y}(t)\cos\omega ct + E_{B-Y}(t)\sin\omega ct \pm K\sin\omega ct \quad (4)$$

where K is a constant.

The third member, ±K sin ωct, among the right-hand members of the equation (4) represents the continuous reference phase signal. In order to identify the order of phase inversion of the reference phase signal, an index pulse signal ±K as shown in FIG. 6(c) is added to the other color difference signal R-Y in the embodiment of the present invention. It will be seen in FIG. 6(c) that the index pulse signal ±K appears in the horizontal blanking period HBLK and has its polarity inverted at a time interval of 1H. The offset voltage signal ±K is added to the color difference signal B-Y for the reason that the red color requires a greater dynamic range than the blue color from the visual viewpoint. However, this offset voltage signal ±K may be added to any one of the color difference signals in principle. For the purpose of identification of the order of phase inversion of the reference phase signal, any desired one of various identification methods employed in, for example, the color-difference line-sequential type of recording and reproduction may be utilized.

The composite signal Ec(t) composed of the quadrature two-phase balanced-modulated color signal $E_{BB}(t)$ and the reference phase signal ±K sin ωc(t) is then multiplexed with the luminance signal Y in the addition circuit 1 to provide a multiplex signal $E_M(t)$ which is expressed as follows :

$$E_M(t) = E_Y(t) + E_c(t) = E_Y(t) + E_{R-Y}(t)\cos\omega ct + E_{B-Y}(t)\sin\omega ct \pm K\sin\omega ct \quad (5)$$

where $E_y(t)$ is the voltage signal wave of Y. In this case, when ωc is selected to have the following relation $$\omega_c = \frac{2n+1}{2}\omega_H \quad (6)$$

with the angular frequency $\omega_H$ of the horizontal scanning, the luminance signal Y can be frequency-interleaved with the quadrature two-phase balanced-modulated color signal $E_{BB}(t)$.

The multiplex signal $E_M(t)$ is then subjected to FM or PM in the angle modulator 12, and, after being amplified by the recording amplifier 13, recorded on a magnetic recording medium such as a magnetic disk or a magnetic tape by the magnetic recording head 14. The output signal of the angle modulator 12 has a frequency distribution as, for example, shown in FIG. 8. FIG. 8 represents the case of FM, and fD indicates a deviation of the FM carrier frequency.

The operation of the reproducing system will now be described with reference to FIGS. 5 and 6.

The output of the reproducing magnetic head 19 is applied to the limiter 20 after being amplified. In the limiter 20, a level variation, if any, is removed from the input signal, and the output of the limiter 20 is demodulated in the angle demodulator 21 depending on FM or PM. The output 21a of the angle demodulator 21 is passed through the low-pass filter 22 and band-pass filter 23. The luminance signal Y appears at the output of the low-pass filter 22, while the composite signal Ec(t) composed of the quadrature two-phase balanced-modulated color signal and the reference phase signal appears at the output of the band-pass filter 23. The composite signal Ec(t) is separated into the quadrature two-phase balanced-modulated color signal $\pm E_{BB}(t)$ and the reference phase signal +K sin ωct by the separation circuit of comb filter type composed of the 1H delay line 24, subtraction circuit 25 and addition circuit 26. For the separation, the strong vertical correlation between adjacent horizontal scanning lines in the color signal is utilized, as will be numerically expressed hereinunder.

Suppose now that the composite signal Eci(t) corresponding to an i-th horizontal scanning line is expressed as follows:

$$E_{ci}(t) = E^i_{R-Y}(t)\cos\omega ct + E^i_{B-Y}(t)\sin\omega ct + K\sin\omega ct \quad (7)$$

Then, the composite signal Eci+1(t) corresponding to an (i+1)th horizontal scanning line should be as follows;

$$E_{ci+1}(t) = E^{i+1}_{R-Y}(t)\cos\omega ct + E^{i+1}_{B-Y}(t)\sin\omega ct - K\sin\omega ct \quad (8)$$

However, due to the fact that ωc is selected to be $$\omega c = \frac{2n+1}{2}\omega_H$$

for the purpose of frequency interleaving of the luminance signal with the quadrature two-phase balanced-modulated color signal, the composite signal Eci+1(t) is now expressed as follows:

$$E_{ci+1}(t) = -E^{i+1}_{R-Y}(t)\cos\omega ct - E^{i+1}_{B-Y}(t)\sin\omega ct + K\sin\omega ct \quad (9)$$

By the way, due to the strong vertical correlation between adjacent horizontal scanning lines in the video signal, the following relations hold:

$$\left.\begin{array}{l}E^{i+1}_{R-Y}(t) \approx E^i_{R-Y}(t) \\ E^{i+1}_{B-Y}(t) \approx E^i_{B-Y}(t)\end{array}\right\} \quad (10)$$

Thus, the equation (7) can be replaced by the following equation (11):

$$E_{ci}(t) = E^{i+1}_{R-Y}(t)\cos\omega ct + E^{i+1}_{B-Y}(t)\sin\omega ct + K\sin\omega c(t) \qquad (11)$$

Therefore, when the output signal of the 1H delay line 24 is subtracted in the subtraction circuit 25 from the input signal to the 1H delay line 24 to compute the result of subtraction of the equation (11) from the equation (9), the following expression (12) is obtained:

$$-2[E^{i+1}_{R-Y}(t)\cos\omega ct + E^{i+1}_{B-Y}(t)\sin\omega ct] \qquad (12)$$

Thus, the quadrature two-phase balanced-modulated color signal can be separated.

On the other hand, when the output signal of the 1H delay line 24 is added in the addition circuit 26 to the input signal to the 1H delay line 24 to compute the result of addition of the equation (9) to the equation (11), the following value is obtained:

$$+2 K \sin \omega ct$$

Thus, the synchronous detection signal for the balanced-modulated color signal portion including the color difference signal B-Y can be separated. Further, when the output of the addition circuit 26 is delayed by 270° in the phase shifter 31, the following value is obtained:

$$+2 K \cos \omega ct$$

Thus, the synchronous detection signal for the balanced-modulated color signal portion including the color difference signal R-Y is obtained. Although the polarity of the output signal of the addition circuit 26 is fixed, the polarity of the output signal of the subtraction circuit 25 is inverted at a time interval of 1H. That is, the result of subtraction $E_{ci+1}(t)-E_{ci}(t)$ provides the output $$-2[E^{i+1}_{R-Y}(t)\cos\omega ct + E^{i+1}_{B-Y}(t)\sin\omega ct]$$

while, the result of subtraction $E_{ci+2}(t)-E_{ci+1}(t)$ provides the output $$+2[E^{i+2}_{R-Y}(t)\cos\omega ct + E^{i+2}_{B-Y}(t)\sin\omega ct]$$

Therefore, when the output, 2 K sin ωct, of the addition circuit 26 is inverted in the inversion circuit 30 at a time interval of 1H, the synchronous detection signal;

$$\pm 2K \sin \omega ct$$

is obtained in which the polarity is inverted as in the case of the separated quadrature two-phase balanced-modulated color signal. When the timing of polarity inversion is wrong, the demodulated color difference signals will have opposite polarities resulting in a color error. To avoid such a trouble, an inversion control pulse signal 41 whose polarity is inverted at a time interval of 1H is generated from the inversion pulse generator 33 on the basis of the detected phase difference signal 40 appearing from the PLL circuit 34, so as to control the switching operation of the inversion circuit 30 by the inversion control pulse signal 41. The operation will be described in further detail hereinunder, and the index pulse signal superposed on the color difference signal R-Y during recording is utilized for this purpose. The limiter 29 is provided so that any level variation may not occur in the synchronous detection signal.

Describing the operation in detail, the horizontal synchronizing signal is separated and extracted from the reproduced luminance signal in the horizontal synchronizing signal separation circuit 52 and is applied to the gate pulse generator 35 which generates a gate pulse signal appearing in the horizontal blanking period HBLK as shown in FIG. 6(d). This gate pulse signal is utilized so as to separate and extract the burst signal, during the horizontal blanking period, from the composite signal Ec(t) appearing at the output of the band-pass filter 23. Since this burst signal is composed of the reference phase signal K sin ωct and the balanced-modulated wave ±K cos ωct of the index pulse signal, its phase changes at a time interval of 1H although its angular frequency is ωc. This burst signal making such a phase change is represented by sin (ωct±(π/4)) as shown in FIG. 6(e). FIG. 7 shows the phase of the index pulse signal relative to the color difference signals R-Y and B-Y. The PLL circuit 34 includes a phase difference detector 34a, a phase compensation circuit 34b and a voltage controlled oscillator (VCO) 34c. In response to the application of the burst signal sin (ωct±(π/4)), the PLL circuit 34 generates a signal sin ωct, and the output 40 of its phase difference detector 34a has a waveform as shown in FIG. 6(f). The polarity of the detected phase difference signal 40 having such a waveform changes in correspondence with that of the index pulse signal. Therefore, the inversion circuit 30 operates with accurate timing when the inversion control pulse signal 41 generated from the pulse generator 33 has a rectangular waveform whose polarity is inverted at a time interval of 1H as shown in FIG. 6(g).

As described above, synchronous detection of the quadrature two-phase balanced-modulated color signal with the signal ±cos ωct demodulates the color difference signal R-Y, and synchronous detection of the color signal with the signal ±sin ωct demodulates the color difference signal B-Y. In this case, the quadrature two-phase balanced-modulated color signal is free from the influence of a level variation that may occur in the course of recording and reproduction, since the color signal is passed together with the reference phase signal through the limiter 20 before being applied to the angle demodulator 21. The synchronous detection signal is also free from a level variation since it is produced from the reference phase signal. Accordingly, the demodulated color difference signals R-Y and B-Y are free from the influence of a level variation that may occur in the course of recording and reproduction, and no deviation of color saturation attributable to a level variation occurs. Further, since the reference phase signal is recorded in multiplex with the quadrature two-phase balanced-modulated color signal and its frequency is the same as that of the subcarrier, its phase change, if any, attributable to a time base variation that may occur in the course of recording and reproduction is almost the same as that of the color signal. Therefore, since the synchronous detection signal produced from the reference phase signal is also subjected to a phase change which is substantially the same as that of the color signal, the demodulated color difference signals R-Y and B-Y are not adversely affected by the time base variation, and deviation of hue attributable to the time base variation is minimized.

The luminance signal Y and the two color difference signals R-Y, B-Y thus demodulated are applied to a unit such as a picture display unit to display a picture. In the reproducing system shown in FIG. 5, the subcarrier of 3.58 MHz produced by the oscillator 39 is applied to the encoder 38 in which the subcarrier of 3.58 MHz is subjected to quadrature two-phase balanced modulation by the two color difference signals R-Y and B-Y, and the so-called chrominance signal thus obtained is superposed on the luminance signal in the adder circuit 37 to appear as the NTSC signal at the output of the adder circuit 37.

The above description is based on the frequency allocation mode shown in FIG. 2(b). The operation of the recording and reproducing system in the cases of the frequency allocation mode shown in FIGS. 1, 2(a), 2(c) and 3 will now be briefly described.

Figure 9:
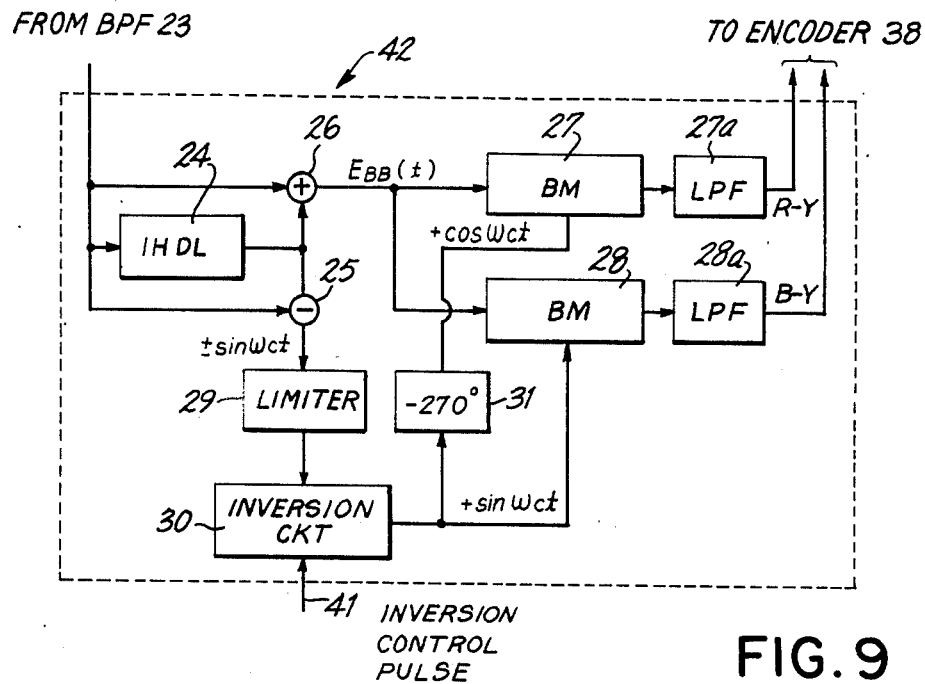
FIG. 9 is a block diagram showing the structure of another form of the demodulation circuit for demodulating the quadrature two-phase balanced-modulated color signal.

In the case of the frequency allocation mode shown in FIG. 1, the operation may be entirely the same as that described with reference to the case of the frequency allocation mode shown in FIG. 2(b). However, since frequency interleaving between the luminance signal and the quadrature two-phase balanced-modulated color signal is unnecessary, the angular frequency $\omega c$ of the subcarrier can be freely selected. For example, the angular frequency $\omega c$ may be $\omega c = n\omega_H$, where n is a positive integer. In such a case, although the recording system may be the same as that shown in FIG. 4, the color-signal demodulating circuit section 42 enclosed by the broken lines in the reproducing system shown in FIG. 5 must be modified to a structure as shown in FIG. 9 in which the subtraction circuit 25 and the addition circuit 26 are interchanged in their disposed positions. The synchronous detection signal for the color difference signal R-Y is $+\cos \omega ct$, while that for the color difference signal B-Y is $+\sin \omega ct$ in FIG. 9.

In the case of the frequency allocation mode shown in FIG. 2(a), the operation may be the same as that described with reference to the case of the frequency allocation mode shown in FIGS. 1 or 2(b). That is, for the purpose of simplicity from the viewpoint of practical applications, the angular frequency $\omega c$ of the subcarrier may be selected to be, for example, $$\omega c = \frac{n}{4} \omega_H \text{ or } \omega c = 2n\omega_H,$$

where n is a positive integer. When perfection is aimed at, the angular frequency $\omega c$ is preferably selected to be $$\omega c = \frac{2n + 1}{2} \omega_H,$$

and the luminance signal is frequency-interleaved with the quadrature two-phase balanced-modulated color signal. When the angular frequency $\omega c$ of the subcarrier is selected to be $$\omega c = \frac{2n + 1}{2} \omega_H$$

as described above, the circuit structure of the recording and reproducing system may be the same as that shown in FIGS. 4 and 5.

In the case of the frequency allocation mode shown in FIG. 2(c), interference of the luminance signal with the reference phase signal must be inhibited since the reference phase signal overlaps partly on the high-band component of the luminance signal.

Figure 10:
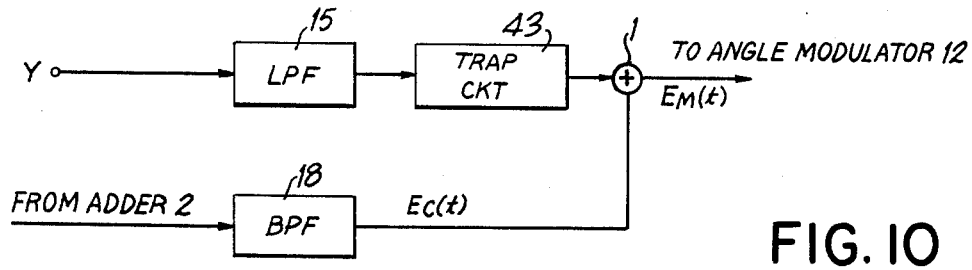
FIG. 10 is a block diagram of a modification where a trap circuit is provided in the recording system.

Therefore, as, for example, shown in FIG. 10, a trap circuit 43 having a central angular frequency of about $\omega r$ is disposed between the low-pass filter 15 and the multiplexing addition circuit 1 in the recording system shown in FIG. 4. The reproducing system may be the same as that shown in FIG. 5 when the angular frequency of the subcarrier is $$\omega c = \frac{2n + 1}{2} \omega_H.$$

On the other hand, when the angular frequency of the subcarrier is $\omega c = n\omega_H$, the demodulation circuit 42 shown in FIG. 9 is preferably employed.

In the case of the frequency allocation mode shown in FIG. 3, it is necessary that the luminance signal and the quadrature two-phase balanced-modulated color signal are frequency-interleaved with each other, and interference of the luminance signal with the reference phase signal is at least inhibited.

Figure 11:
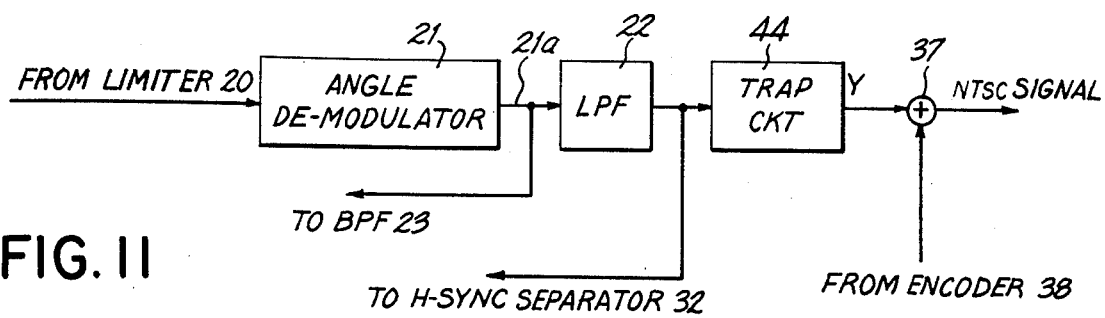
FIG. 11 is a block diagram of a modification where a trap circuit is provided in the reproducing system.

As an example, the angular frequency of the subcarrier is selected to be $$\omega c = \frac{2n + 1}{2} \omega_H,$$

and a trap circuit 43 as shown in FIG. 10 is preferably disposed in the recording system shown in FIG. 4. However, when it is required to eliminate a vertical stripe pattern appearing in a reproduced picture as a result of interference of the reference phase signal with the luminance signal, a trap circuit 44 having a central angular frequency of about $\omega r$ as shown in FIG. 11 is preferably disposed between the low-pass filter 22 in the angle demodulation system and the addition circuit 37 in the reproducing system shown in FIG. 5.

As another example, the angular frequency of the subcarrier is selected to be $$\omega c = \frac{2n + 1}{4} \omega_H,$$

and the three signals, that is, the luminance signal, the quadrature two-phase balanced-modulated color signal and the reference phase signal are frequency-interleaved with one another. For this purpose, the polarity of the reference phase signal is inverted at a time interval of 2H so as to frequency-interleave the reference phase signal with the quadrature two-phase balanced-modulated color signal. The recording system is the same as that shown in FIG. 4, except the generation of the offset voltage and index pulse signal. The color-signal demodulating circuit section 42 in the reproducing system shown in FIG. 5 is preferably modified to a structure as, for example, shown in FIG. 12. FIG. 13 shows the relation between the offset voltage and the index pulse signal. Suppose now that the composite signal Eci(t) composed of the reference phase signal and the quadrature two-phase balanced-modulated color signal and corresponding to an i-th horizontal scanning line is expressed as follows:

$$E_{ci}(t) = E^i_{R-Y}(t)\cos\omega ct + E^i_{B-Y}(t)\sin\omega ct + K\sin\omega ct \qquad (13)$$

Then, the composite signal Eci+1(t) corresponding to an (i+1)th horizontal scanning line should be expressed as follows:

$$E_{ci+1}(t) = E^{i+1}_{R-Y}(t)\cos\omega ct + E^{i+1}_{B-Y}(t)\sin\omega ct - K\sin\omega ct \qquad (14)$$

However, since the angular frequency of the subcarrier is selected as $$\omega c = \frac{2n+1}{4}\omega_H \qquad (15)$$

Suppose that n is an even number, then, the composite signal Eci+1(t) is now expressed as follows:

$$E_{ci+1}(t)_e = -E^{i+1}_{R-Y}(t)\sin\omega ct + E^{i+1}_{B-Y}(t)\cos\omega ct + K\cos\omega ct \qquad (16)$$

Thus, the composite signals Eci+j (t)e corresponding to sequential (i+j)th horizontal scanning lines (where j=2, 3, 4, 5, and n is an even number) are expressed as follows:

$$E_{ci+2}(t)_e = -E^{i+2}_{R-Y}(t)\cos\omega ct - E^{i+2}_{B-Y}(t)\sin\omega ct + K\sin\omega ct \qquad (17)$$

$$E_{ci+3}(t)_e = E^{i+3}_{R-Y}(t)\sin\omega ct - E^{i+3}_{B-Y}(t)\cos\omega ct + K\cos\omega ct \qquad (18)$$

$$E_{ci+4}(t)_e = E^{i+4}_{R-Y}(t)\cos\omega ct + E^{i+4}_{B-Y}(t)\sin\omega ct + K\sin\omega ct \qquad (19)$$

$$E_{ci+5}(t)_e = -E^{i+5}_{R-Y}(t)\sin\omega ct + E^{i+5}_{B-Y}(t)\cos\omega ct + K\cos\omega ct \qquad (20)$$

On the other hand, due to the strong vertical correlation between adjacent horizontal scanning lines in the video signal, the following relations hold:

$$\left.\begin{array}{l} E^{i+2}_{R-Y}(t) \approx E^i_{R-Y}(t), E^{i+3}_{R-Y}(t) \approx E^{i+1}_{R-Y}(t) \\ E^{i+4}_{R-Y}(t) \approx E^{i+2}_{R-Y}(t)\ E^{i+5}_{R-Y}(t) \approx E^{i+3}_{R-Y}(t) \end{array}\right\} \qquad (21)$$

$$\left.\begin{array}{l} E^{i+2}_{B-Y}(t) \approx E^i_{B-Y}(t), E^{i+3}_{B-Y}(t) \approx E^{i+1}_{B-Y}(t) \\ E^{i+4}_{B-Y}(t) \approx E^{i+2}_{R-Y}(t)\ E^{i+5}_{B-Y}(t) \approx E^{i+3}_{B-Y}(t) \end{array}\right\} \qquad (22)$$

Figure 12:
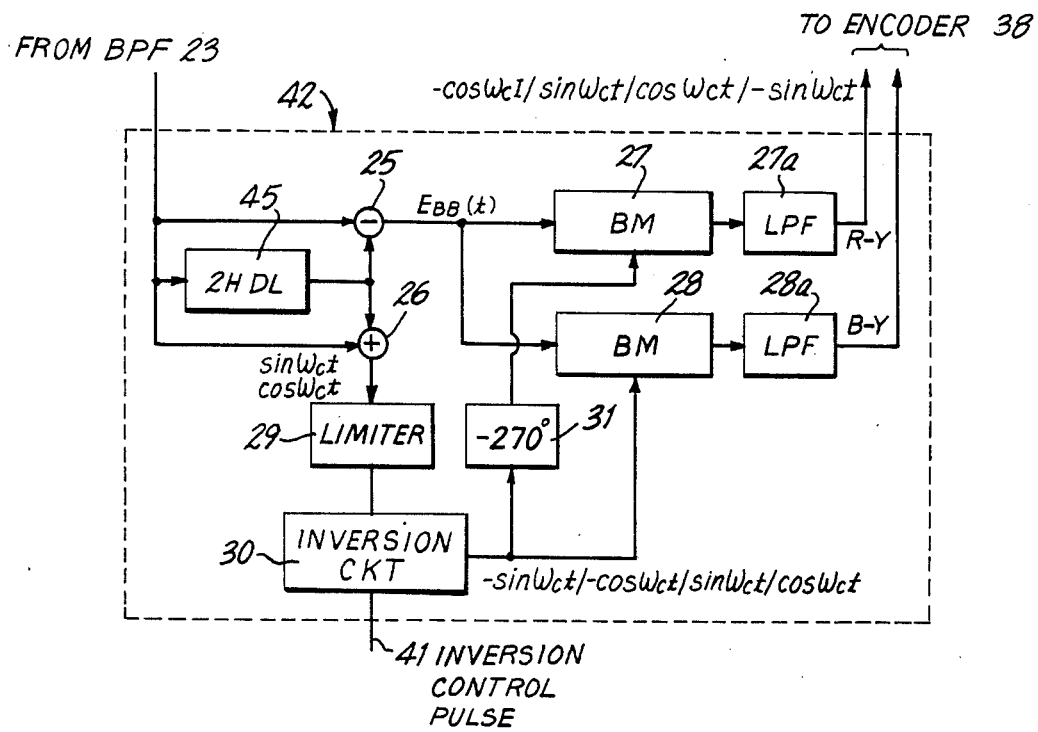
FIG. 12 is a block diagram showing the structure of still another form of the demodulation circuit for demodulating the quadrature balanced-modulated color signal.
Figure 13:
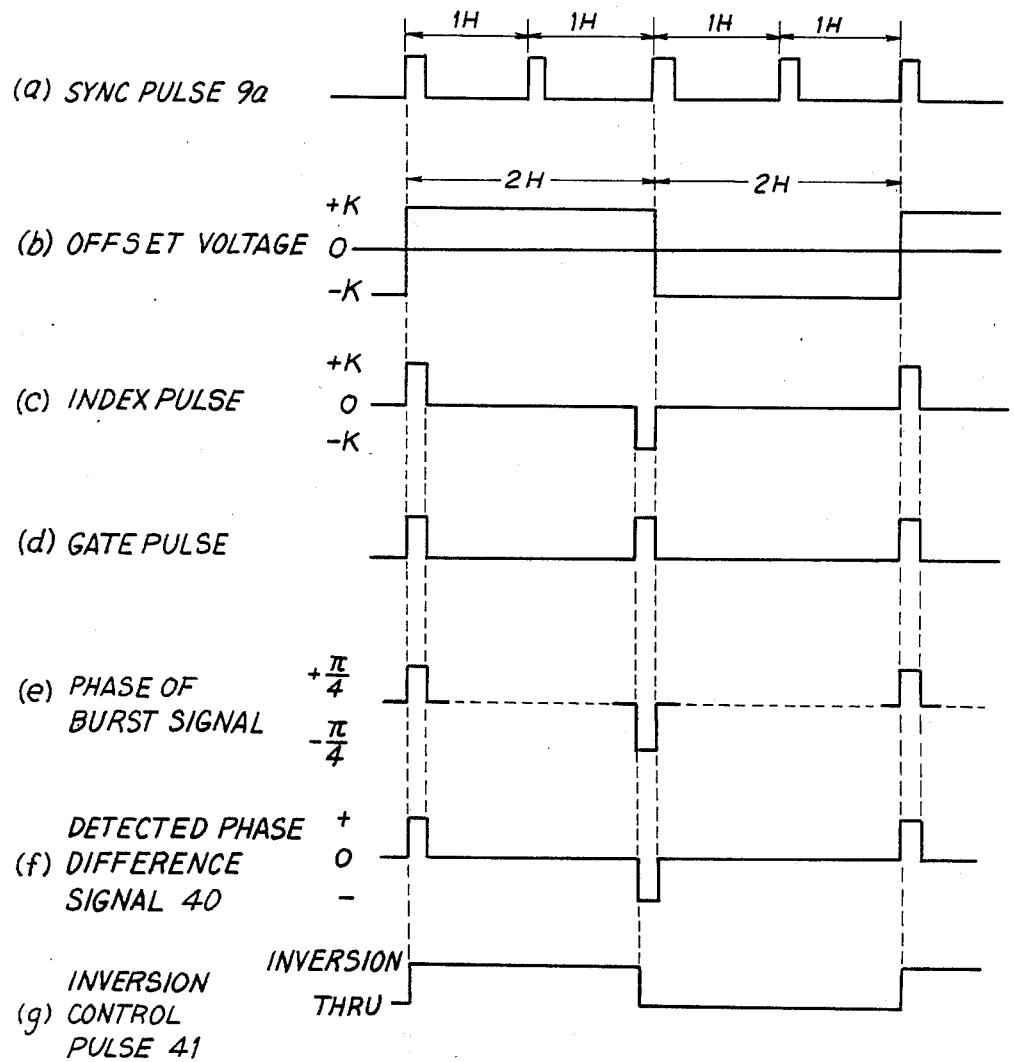
FIGS. 13 (a) to 13 (g) show operating waveforms appearing at various parts of FIGS. 4 and 12 when the frequency of the subcarrier is $$\omega c = \frac{2n+1}{4} \omega_H.$$

Therefore, when the output signal of a 2H delay line 45 is subtracted in the subtraction circuit 25 from the input signal to the 2H delay line 45 in FIG. 12, the quadrature two-phase balanced-modulated color signal can be separated. That is, subtraction of the equation (13) from the equation (17) provides the color signal expressed as follows:

$$-2[E^{i+2}_{R-Y}(t)\cos\omega ct + E^{i+2}_{B-Y}(t)\sin\omega ct] \qquad (23)$$

Subtraction of the equation (16) from the equation (18) provides the color signal expressed as follows:

$$2[E^{i+3}_{R-Y}(t)\sin\omega ct - E^{i+3}_{B-Y}(t)\cos\omega ct] \qquad (24)$$

Subtraction of the equation (17) from the equation (19) provides the color signal expressed as follows:

$$2[E^{i+4}_{R-Y}(t)\cos\omega ct + E^{i+4}_{B-Y}(t)\sin\omega ct] \qquad (25)$$

Subtraction of the equation (18) from the equation (20) provides the color signal expressed as follows:

$$2[-E^{i+5}_{R-Y}(t)\sin\omega ct + E^{i+5}_{B-Y}(t)\cos\omega ct] \qquad (26)$$

On the other hand, when the output signal of the 2H delay line 45 is added in the addition circuit 26 to the input signal to the 2H delay line 45 in FIG. 12, the reference phase signal can be separated. That is, addition of the equation (13) to the equation (17) provides the reference phase signal expressed as follows:

$$2K \sin \omega ct \qquad (27)$$

Addition of the equation (16) to the equation (18) provides the reference phase signal expressed as follows:

$$2 K \cos \omega ct \qquad (28)$$

Addition of the equation (17) to the equation (19) provides the reference phase signal expressed as follows:

$$2 K \sin \omega ct \qquad (29)$$

Addition of the equation (18) to the equation (20) provides the reference phase signal expressed as follows:

$$2 K \cos \omega ct \qquad (30)$$

Although the color difference signals B-Y expressed as $$-E^{i+2}_{B-Y}(t),\ -E^{i+3}_{B-Y}(t),\ +E^{i+4}_{B-Y}(t),\ +E^{i+5}_{B-Y}(t),$$

can be sequentially demodulated when the output signal of the addition circuit 26 is directly used for the synchronous detection of the output signal of the subtraction circuit 25 in FIG. 12, the polarity of the signals B-Y is inverted at a time interval of 2H, resulting in occurrence of a color error. Therefore, the polarity of the output signal of the addition circuit 26 is inverted at a time interval of 2H in the inversion circuit 30 to provide the B-Y demodulation signal. For the demodulation of the color difference signals R-Y, the phase of the output signal of the inversion circuit 30 is delayed by 270° in the phase shifter 31, and such a signal is used for the synchronous detection of the output signal of the subtraction circuit 25. When the inversion circuit 30 operates with wrong timing, a color error results. Therefore, the inversion control pulse signal 41 applied to the inversion circuit 30 is produced as described below by way of example. That is, the offset voltage superposed on the color difference signal B-Y during recording is changed over between +K and −K at a time interval of 2H as shown in FIG. 13(b), and the index pulse signal superposed on the color difference signal R-Y during recording is also changed over between +K and −K at a time interval of 2H as shown in FIG. 13(c). Also, the gate circuit 36 applying the burst signal to the PLL circuit 34 is triggered by a timing pulse signal having a pulse period of 2H as shown in FIG. 13(d). The function of the circuit shown in FIG. 12 is the same as that described with reference to FIGS. 4 to 6 except for the above differences. Further, the function is generally similar to that above described even when n is an odd number.

It will be understood from the foregoing detailed description of preferred embodiments of the present invention that color information can entirely be recorded without partial drop-out of information experienced hitherto with the color-difference line-sequential FM type of recording and reproduction, and, even when a time base variation or a level variation may occur, it does not substantially lead to the deviation of hue or color saturation experienced hitherto with the low-band conversion type of recording and reproduction. Therefore, a color video signal of high picture quality can be recorded and reproduced. While the foregoing description has referred to an application of the present invention to a magnetic picture recording and reproducing apparatus by way of example, it is apparent that the present invention is equally effectively applicable to recording and reproduction of still and movie pictures. It is further apparent that the present invention is also applicable to various kinds of color video signal recording systems including, for example, an optical video disk apparatus.

Now, the relation between the recording and reproducing system of the present invention and the desired high recording density of magnetic records. In many of magnetic picture recording and reproducing apparatus presently in use, the inclined azimuth arrangement is used for the purpose of guardband-less recording. It is needless to mention that the inclined azimuth arrangement can also be employed in the recording and reproducing system of the present invention. Employment of the inclined azimuth arrangement tends to give rise to a problem that the azimuth effect is not fully exhibited in a low frequency range. However, such a problem can be solved by means which will be described hereinunder.

Figure 14:
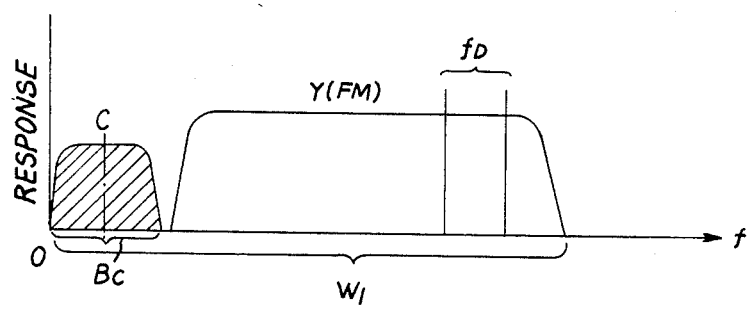
FIG. 14 illustrates a manner of frequency allocation to an FM luminance signal and a low-band-converted quadrature two-phase balanced-modulated color signal (a low-band converted chrominance signal) in the case of the low-band conversion type of recording and reproducing system.

(a) In the case of the low-band conversion type of recording and reproduction, the mode of frequency allocation is as shown in FIG. 14, and the occupied bandwidth $W_1$ required for recording of a color video signal is approximately as follows:

$$W_1 = \text{(Band of FM luminance signal)} +$$

(Band $Bc$ of quadrature two-phase balanced-modulated color signal)

Figure 15:
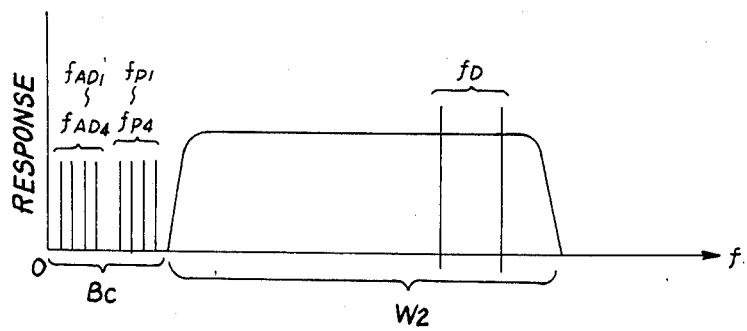
FIG. 15 illustrates the frequency band of the angle modulation signal when the inclined azimuth arrangement is also used for the guardband-less recording in the present invention.

In contrast, in the case of the recording and reproducing system of the present invention, the occupied bandwidth $W_2$ can be made narrower than $W_1$ by about the band Bc of the quadrature two-phase balanced-modulated color signal as seen in FIG. 15 when the mode of frequency allocation is as shown in FIG. 3. Therefore, the modulation band can be so set that the low-frequency band in which the azimuth effect is not fully effective may not be used as shown in FIG. 15, without increasing the upper limit frequency. FM audio signals $f_{AD1}$ to $f_{AD4}$ and pilot signals $f_{P1}$ to $f_{P4}$ required for the tracking servo, etc, can be allotted to this emptied low-frequency band so as to attain full utilization of the frequency. The FM audio signals have different carriers between tracks so as to prevent crosstalk.

(b) In the case of phase modulation (PM) of the multiplex signal EM(t), the technique disclosed in Japanese Patent Publication No.56-51406 (1981) or Japanese Patent Application Laid-open No.53-41126 (1978) may be utilized. The conditions are such that the modulation index mp is selected to be less than or equal to a certain value as mp $\leq 1.3$ thereby suppressing appearance of secondary and higher sideband components, the recorded positions of the vertical synchronizing signal on adjacent tracks of a magnetic recording medium are at least aligned (V alignment), and, preferably, the recorded positions of the horizontal synchronizing signal on the adjacent tracks are also aligned (H alignment). The conditions are also such that the phases of the center frequency of the PM multiplex signal are aligned on the adjacent tracks, the center frequencies of the quadrature two-phase balanced-modulated color signal are aligned on the adjacent tracks, and the phase inversions ($\phi$, $\pi$) of the reference phase signal at the time interval of 1H or 2H are aligned on the adjacent tracks of the magnetic recording medium. When, after the color video signal satisfying the above conditions is recorded at a high recording density in a guardband-less fashion or partly overlapping fashion, two or more tracks are scanned by the reproducing head, the color video signal can be reproduced without the problem of beat interference, crosstalk trouble or out-of-synchronization, by virtue of the strong vertical correlation between adjacent horizontal scanning lines in the color video signal.

What is claimed is:

1. A color video signal recording system comprising:
    means for modulating a first color signal and a second color signal onto a subcarrier by a quadrature two-phase balanced modulation;
    means for generating a reference phase signal having a frequency equal to the frequency of said subcarrier;
    multiplexing means for combining said reference phase signal with a modulated color signal outputted by said modulation means and with a luminance signal, said multiplexing means outputting a multiplexed signal wherein said reference phase signal is frequency-interleaved with said modulated color signal;
    means for applying an angle modulation to said multiplexed signal; and
    means for recording on a recording medium an angle-modulated signal outputted by said angle modulation means 2. A system according to claim 1 wherein said luminance signal has an upper limit frequency, and the frequency of said subcarrier is approximately equal to said upper limit frequency of said luminance signal.

3. A system according to claim 1 wherein said modulation means includes a first two-phase modulator for modulating said first color signal and a second two-phase modulator for modulating said second color signal. each of said two-phase modulators outputting a low-frequency sideband which partially overlaps a frequency band of said luminance signal; and wherein
    within said multiplexed signal outputted by said multiplexing means, said modulated color signal is frequency-interleaved with said luminance signal.

4. A system according to claim 1 wherein the frequency of said subcarrier lies within a frequency band of said luminance signal; and wherein
    within said multiplexed signal outputted by said multiplexing means, said modulated color signal and said reference phase signal are each frequency-interleaved with said luminance signal.

5. A system according to claim 1 wherein the frequency of said subcarrier is approximately equal to a frequency of said luminance signal;
    said system further comprising a trap circuit coupled to an input terminal of said multiplexing means for attenuating said luminance signal prior to a multiplexing of said luminance signal with said modulated color signal and said reference phase signal; and wherein the frequency of said subcarrier lies within a frequency band of said luminance signal; and within said multiplexed signal outputted by said multiplexing means, said modulated color signal is frequency-interleaved with said luminance signal.

6. A system for reproducing a color video signal composed of a first color signal and a second color signal and a luminance signal, which video signal has been recorded by a process of:

modulating the first color signal and the second color signal onto a subcarrier by a quadrature two-phase balanced modulation, said modulating step producing a modulated color signal;

generating a reference phase signal having a frequency equal to said subcarrier;

multiplexing said reference phase signal with said modulated color signal and with the luminance signal to produce a multiplexed signal;

applying an angle modulation to said multiplexed signal to provide a modulated multiplexed signal; and recording on a recording medium said modulated multiplexed signal to produce a recorded signal;

said reproducing system comprising:

means for limiting an amplitude of said recorded signal;

demodulation means coupled to an output terminal of said limiting means for providing an angle demodulation of a signal outputted by said limiting means, said demodulation means providing a demodulated signal;

means operative upon said demodulated signal for separating said luminance signal and said modulated color signal and said reference phase signal from said demodulated signal; and further demodulation means responsive to said modulated color signal and said reference phase signal provided by said separating means for demodulating said modulated color signal to obtain said first and said second color signals.

* * * * *